Sept. 6, 1960 I. DORMAN ET AL 2,951,262
METHOD AND APPARATUS FOR FORMING PELLETS
OF THERMOPLASTIC MATERIAL
Filed April 7, 1958 4 Sheets-Sheet 1

INVENTORS
Isidore Dorman
Curtis G. Hoos
BY
Johnson and Kline
ATTORNEYS

INVENTORS
Isidore Dorman
Curtis G. Hoos

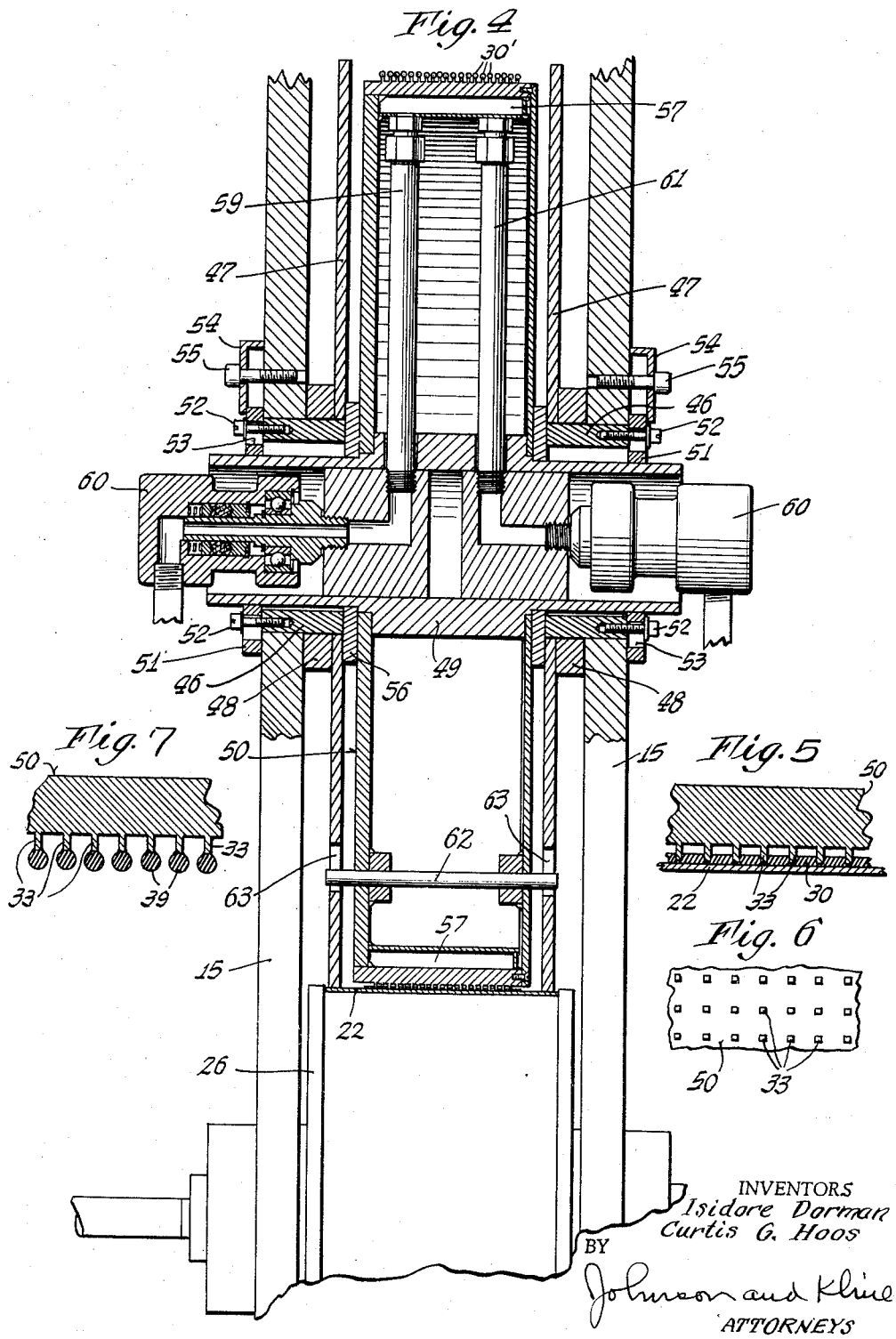

United States Patent Office 2,951,262
Patented Sept. 6, 1960

2,951,262
METHOD AND APPARATUS FOR FORMING PELLETS OF THERMOPLASTIC MATERIAL

Isidore Dorman, Whitestone, N.Y. (112—19 14th Road, College Point, N.Y.), and Curtis G. Hoos, 144—06 37th Ave., Flushing, N.Y.

Filed Apr. 7, 1958, Ser. No. 726,876

18 Claims. (Cl. 18—24)

This invention relates to the treatment of thermoplastic material and more particularly polymorphic fat substances of the type including cocoa butter to form pellets thereof. More specifically it pertains to a method and apparatus for obtaining high melting point, form-retaining pellets of polymorphic fat substances for use in the manufacture of suppositories and the like.

We have found that natural fat substances, of the type including cocoa butter, tend to change their thermal and form-retaining characteristics when they are worked in the manufacture of suppositories and like articles. We have also discovered that pellets of the natural fat may be utilized in manufacturing, thus eliminating the working of the fat with its resultant, characteristic, changes.

It is known, that natural fats are polymorphous and that polymorphism, which is the existence of a substance in more than one crystal form, is more in evidence in such fats when they are relatively simple in composition and consist predominantly of one glyceride or one class of closely related glycerides, cocoa butter being an outstanding example of a highly polymorphous fat substance (Melting and Solidification of Fats, A. E. Bailey, Interscience, 1950).

Polymorphic fat substances, as characterized by cocoa butter, may crystallize into stable or unstable fat materials. Stable fats are usually obtained by stirring and slowly reducing the temperature of the mass so that, in turn, each crystal form nucleates and proliferates at maximum rates after the temperature declines and passes through the temperature ranges at which the several crystal forms spontaneously come into being. This results in a stable material, all of whose crystal forms are solidified when the minimum temperature is reached. Stable material does not melt if the temperature is raised above the melting point of the lowest melting point crystal forms; those crystal forms having a higher melting point remain in the solid state. As little as 5% of the crystals need be retained in the solid state to prevent the fat from changing form. The temperature of stable fat material can be raised through those temperature ranges at which each successive crystal form is reduced to liquid, until there is only 5% crystalline material left, without having the material lose its form-retaining state.

Unstable fats do not have all their crystal forms solidified. A preponderance of the solid material is made of low melting point crystals, and if the temperature is raised above the melting point of the low melting point crystal forms, these become liquid and there may not be sufficient other crystals of high melting point remaining in the solid state to cause the mass to retain its shape. Continued raising of the temperature causes the higher melting point crystals to come into being and resolidification of the material occurs. The process of thermal reduction, nucleation and proliferation repeats itself depending on the number of crystal forms present in the mass of material and their melting point.

When stable fat materials are extruded, ground, subjected to intense shearing or similarly worked, we have found that they have a lower melting point and reduced form-retaining ability. From a practical point of view, stable fat materials, worked in this manner, become unstable and cannot be made stable again without reducing the mass to a liquid state and resolidifying it, as above described.

Cocoa butter, which is a polymorphic fat substance, commonly used in suppositories and like articles, consists of predominantly several glycerides. These glycerides are capable of crystallizing into any or all of three crystal forms, each of which forms differ in size and melting point. Generally the higher melting point crystals are the largest. The particular crystal form into which the glycerides crystallize depends upon the conditions of temperature and agitation and the length of time to which the glycerides are subjected to such conditions. The rate of crystal nuclei formation, for any crystal form, reaches a maximum at a certain temperature, each crystal form having a different temperature for its different maximum rate. Proliferation of the crystal nuclei once it has come into being, is spectacularly increased by agitation of the mass.

In utilizing cocoa butter, for instance, in the manufacture of suppositories or the like, it is desirable to achieve an end product having a relatively high, substantially stable melting point and good form-retaining characteristics. A suppository, which has cocoa butter as a major ingredient, must maintain its form while under conditions similar to those it would experience during passage from manufacturer to consumer. Specifically, a molded cylinder having a diameter of .375" must remain in an atmosphere of 99.5° F., on a plane surface, for sixty minutes without becoming substantially flat at its line of contact with such surface. Cocoa butter, though considered a stable fat material, becomes unstable when it is subjected to the various workings necessary to form it into a suppository and, therefore, produces an unsatisfactory end product, which will not meet required standards.

This invention overcomes the problems aforenoted, with respect to the thermal stability and form-retaining characteristics of polymorphic fat substances. It provides a method and an apparatus for treating the polymorphic fat substances to provide a pellet thereof which need not be worked, in accordance with the common usage of that word, in the manufacture of suppositories or like articles.

We have found that by heating a mass of polymorphic fat substance, to a degree sufficient to bring high melting point crystals into being and to thermally reduce low melting point crystals, and then rapidly chilling it to a point below the forming point of the low melting point crystals, a material may be formed, having the characteristics of the high melting point crystals. At the temperature where high melting point crystals are brought into being, the lower melting point crystals are broken up by thermal activity. Agitation serves to distribute the high melting point crystals through the mass of fat material and their proliferation is encouraged by the high temperature condition and agitation. When the agitation is stopped the temperature is rapidly lowered to a point below the area of nuclei formation of the lowest melting point crystal forms. The crystals which are thus formed are of the highest melting point type; the temperature, at which the lower melting point crystal nuclei are formed, is passed, when the mass is rapidly cooled, so quickly that few of these crystals are brought into being. Those that are formed are not spread through the mass of material since substantially all agitation of the material has ceased. At the final lowest temperature, to which the material is brought, the growth of the highest melting point crystals proceeds. The result of this procedure is a solidified mass in which the highest melting point crystals predominate, the melting point of the mass being at a maximum. The mass of material thus produced is highly stable, however, if it is extruded, ground, subjected to intense shearing or similarly disturbed during the manufacture of a consumer product it will become unstable; this instability proves unsatisfactory in the manufacture of suppositories or like end products. To overcome this problem, while utilizing the principles of our concept, our method contemplates forming pellets from the original mass of heated material, which pellets need only be pressed into a mold to form suppositories or like end products. We accomplish this by rapidly cooling a globule of the heated material, without agitation, on a pin having a cold surface, the pin being gradually withdrawn from the mass of heated material such that rapid cooling will transform the globule into a solid pellet.

It is an object of the invention to provide a method for forming pellets, from polymorphic fat substances, which have the thermal and form-retaining characteristics of the highest melting point crystals within the substance.

It is also an object of the invention to provide a method for forming pellets from polymorphic fat substances wherein a mass of the substance is heated to a degree sufficient to bring high melting point crystals into being and thermally reduce low melting point crystals and rapidly cooling a globule of such heated material so that a solid pellet is formed.

It is also an object of the invention to provide a method for forming pellets of cocoa butter which are adapted to be utilized without working, in the manufacture of suppositories or the like, to provide an end product having desired melting and form-retaining characteristics.

It is further an object of the invention to provide an apparatus for forming pellets from polymorphic fat substances, which pellets have the thermal and form-retaining characteristics of the high melting point crystals within the polymorphic fat substance.

It is still further an object of the invention to provide an apparatus for forming pellets of cocoa butter, for use in manufacturing suppositories or like articles, wherein the end product has desired thermal and form-retaining characteristics.

While the invention is herein described as being of particular utility in forming pellets of cocoa butter, it is also useful in producing pellets of any thermoplastic material capable of forming a body on a chilled pin inserted into a molten mass of the material.

With these and other objects in mind, reference is had to the attached sheets of drawings, illustrating one form of the invention, wherein like characters represent like parts, and in which:

Fig. 4 is an enlarged fragmentary cross-section illustrating, in detail, the structure of the pellet forming drum;

Fig. 5 is a substantially schematic view showing the pellet forming pins in engagement with a thin layer of polymorphic fat substance;

Fig. 6 is a substantially schematic view of the pattern taken by the pellet forming pins on the pellet forming drum of the apparatus; and Fig. 7 is a schematic view illustrating the pellet forming pins with pellets formed thereon.

Broadly, our invention is directed to forming pellets of a polymorphic fat substance, having the thermal and form-retaining characteristics of the highest melting point crystals in the substance, which may be pressed into a mold, in the manufacture of articles which, of necessity, must meet thermal and form-retaining standards.

It is contemplated that a polymorphic fat substance, of the type including cocoa butter, will be heated, to a temperature sufficient to bring high melting point crystals into being and thermally reduce low melting point crystals, so that a molten mass of the substance is provided. It has been found convenient, when the material being treated is cocoa butter, to heat a mass to a temperature of 140° F. At this temperature nuclei of the high melting point crystals form and the low melting point crystals are reduced by thermal activity. Agitation of the molten mass will facilitate proliferation of the high melting point crystals. After a mass of the molten material is provided and agitation has ceased, a chilled pin, having a cold surface, is inserted into the mass to chill a portion thereof, adjacent the cold surface, to form a globule of the material on the pin. It should here be noted, that insertion of the pin, formation of the globule and the subsequent withdrawal of the pin should be accomplished without agitating the material; agitation at this point would tend to increase the nucleation and proliferation of the low melting point crystals.

In order to facilitate the formation of globules, without agitating the mass of material, we have found it expedient to form a thin layer of the material, as would be accomplished by wiping the same on a surface, for chilling association with the pin.

After the pin has been inserted in the material and a globule formed thereon, it is gradually withdrawn and the globule rapidly cooled to form a solid pellet. Cooling should be sufficiently rapid to lower the temperature of the globule, below the forming temperature of the low melting point crystals, in order to eliminate an appreciable formation of such crystals. Rapid cooling may be achieved through the chilled pin and/or by passing the globule through a refrigerated atmosphere. It may, of course, be accomplished by other means. After the pellet has hardened, it may be removed from the pin for use in the manufacture of suppositories or like articles.

Figure 1:
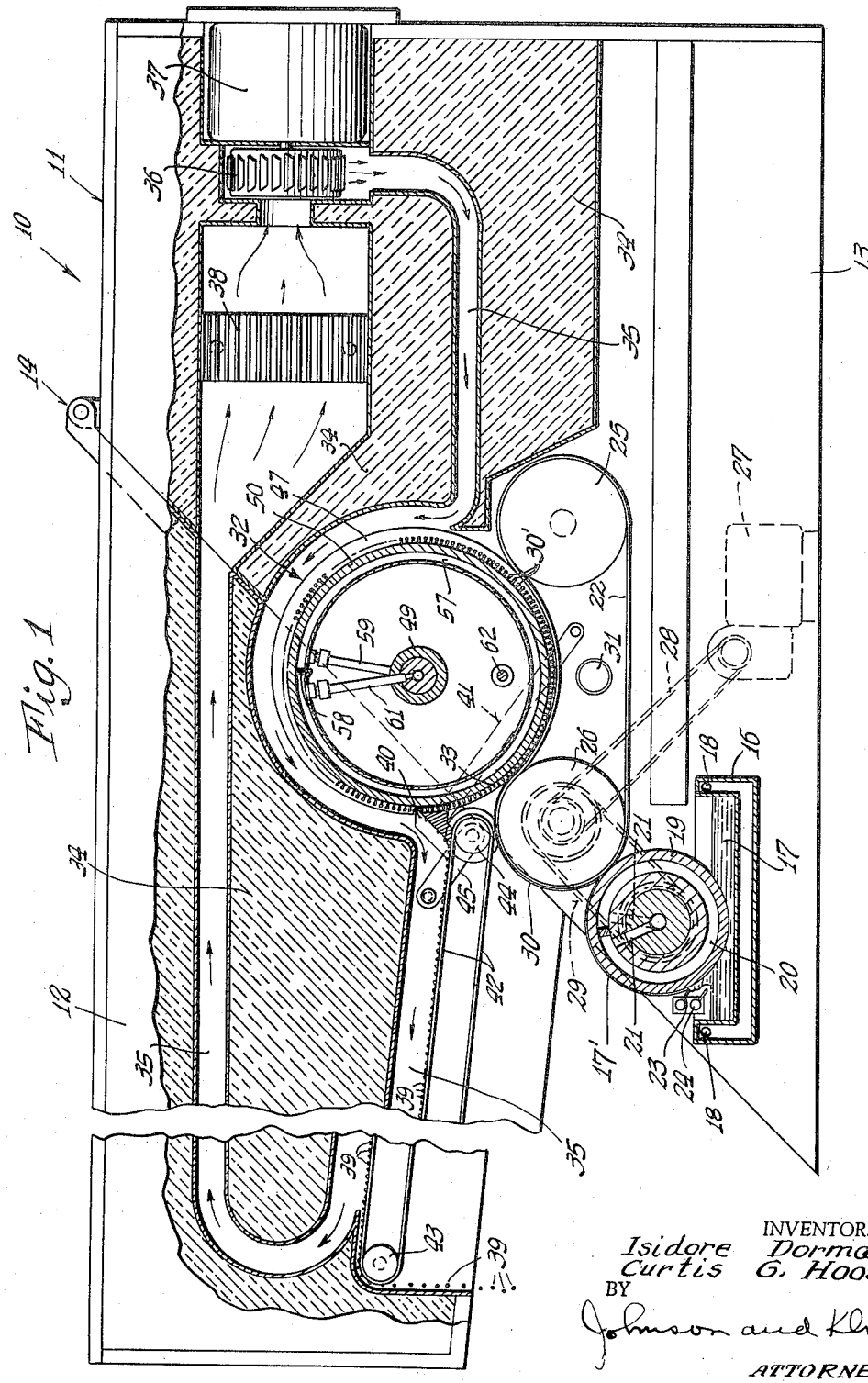
Figure 1 is an elevational side view, partially broken away and partially in section, illustrating an apparatus contemplated by this invention for forming pellets from polymorphic fat substances.
Figure 2:
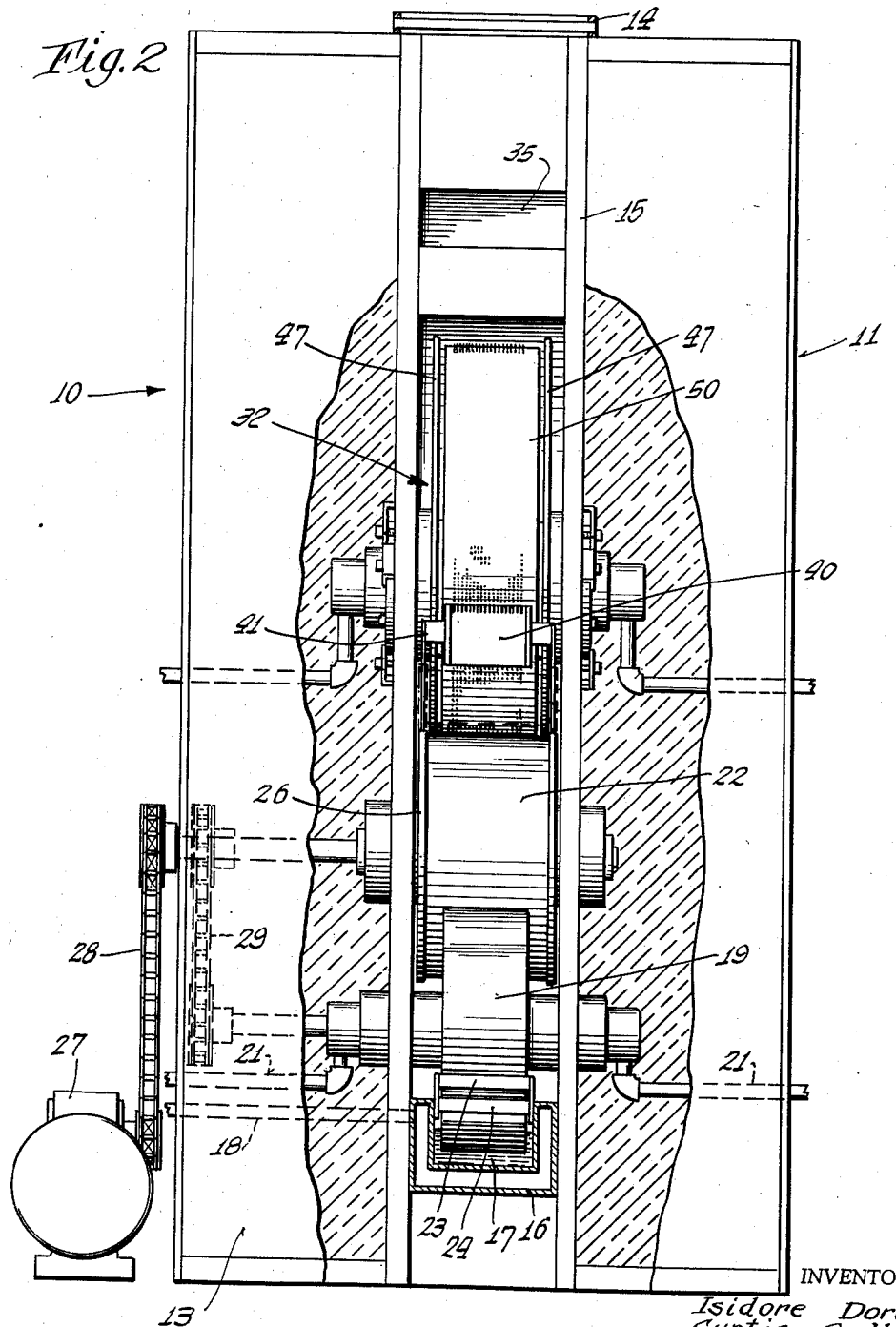
Fig. 2 is a front elevational view, partially broken away, illustrating the apparatus of Fig. 1.

Referring now to the drawings, and Figs. 1 and 2, in particular, an apparatus for forming pellets from molten polymorphic substances is generally indicated by the numeral 10. A frame 11, which includes a cover portion 12 and a base portion 13, is formed with a support 15. The base and cover portion of the frame are hingedly connected, as at 14, to provide access to the interior of the frame. Mounted by support 15, adjacent the bottom thereof, is a hollow walled tank 16, which is adapted to contain a mass of molten polymorphic fat substance 17. Inlet and outlet connections 18 circulate heated fluid through the walls of the tank to heat the contents 17. It has been found desirable, when pellets of cocoa butter are being formed to heat the mass 17 to 140° F., at which temperature the high melting point crystals of the substance are brought into being and the low melting point crystals are thermally reduced.

Rotatably mounted by support 15, adjacent and above the open end of tank 16, is a heated wetting roller 19. The wetting roller, which is formed with a chamber 20 for the circulation of heated fluid from inlet and outlet connections 21, is adapted to remove a portion of the molten substance 17 from tank 16, as indicated at 17', and, while maintaining its temperature, transfers it to a flexible metal belt 22. A doctor blade 23 is mounted adjacent wetting roller 19, for controlling the amount of material removed from the tank, as is a cutoff blade 24. The flexible metal belt 22 is movably supported, above and adjacent roller 19, by pulleys 25 and 26, which are journaled in support 15, the latter of the pulleys being driven by motor and speed reducer 27 through chain belt 28. Wetting roller 19 is driven by pulley 26, through chain belt 29, thereby transferring molten material 17' to the belt 22, as indicated at 30. It should here be noted, that a radiant heater 31, or similar device, may be positioned adjacent flexible metal belt 22 to maintain the temperature of the thin layer of molten material 30 thereon.

Rotatably mounted by support 15, above and between pulleys 25 and 26, is a pin-carrying assembly 32, to be more fully described below. The assembly, which mounts a plurality of radially extending pins 33, is frictionally driven and is adapted to insert the pins into the thin layer of molten material 30, on belt 22, and then gradually withdraw the pins therefrom with a globule 30' of the material affixed to the pin. Baffles, formed by insulation chambers 34, provide a channel 35 for a cold air stream (indicated by the arrows in Fig. 1) emanating from centrifugal blower 36, which is driven by motor 37. The air stream travels a path, in line with the path of rotation of assembly 32, to rapidly cool the globules, formed on the pins, to a temperature below the forming temperature of the low melting point crystals and thereafter is recirculated through a cooling coil 38 and the blower 36. In this manner, the globules 30' are transformed into solid pellets 39. Adjacent the pin-carrying assembly and also in line with its path of rotation, is a comb 40, pivotally secured to support 15 by arm 41, and adapted to remove pellets 39 from the assembly and guide them to conveyor belt 42, which, in turn, carries the pellets to a receptacle, not shown. The conveyor belt is carried by stationary pulley 43, rotatably secured to support 15, and pivotally mounted pulley 44, which is secured to the support through arm 45, for frictional driving engagement with metal belt pulley 26. The elasticity of conveyor belt 42 retains pulley 44 in driving engagement with pulley 26.

Figure 3:
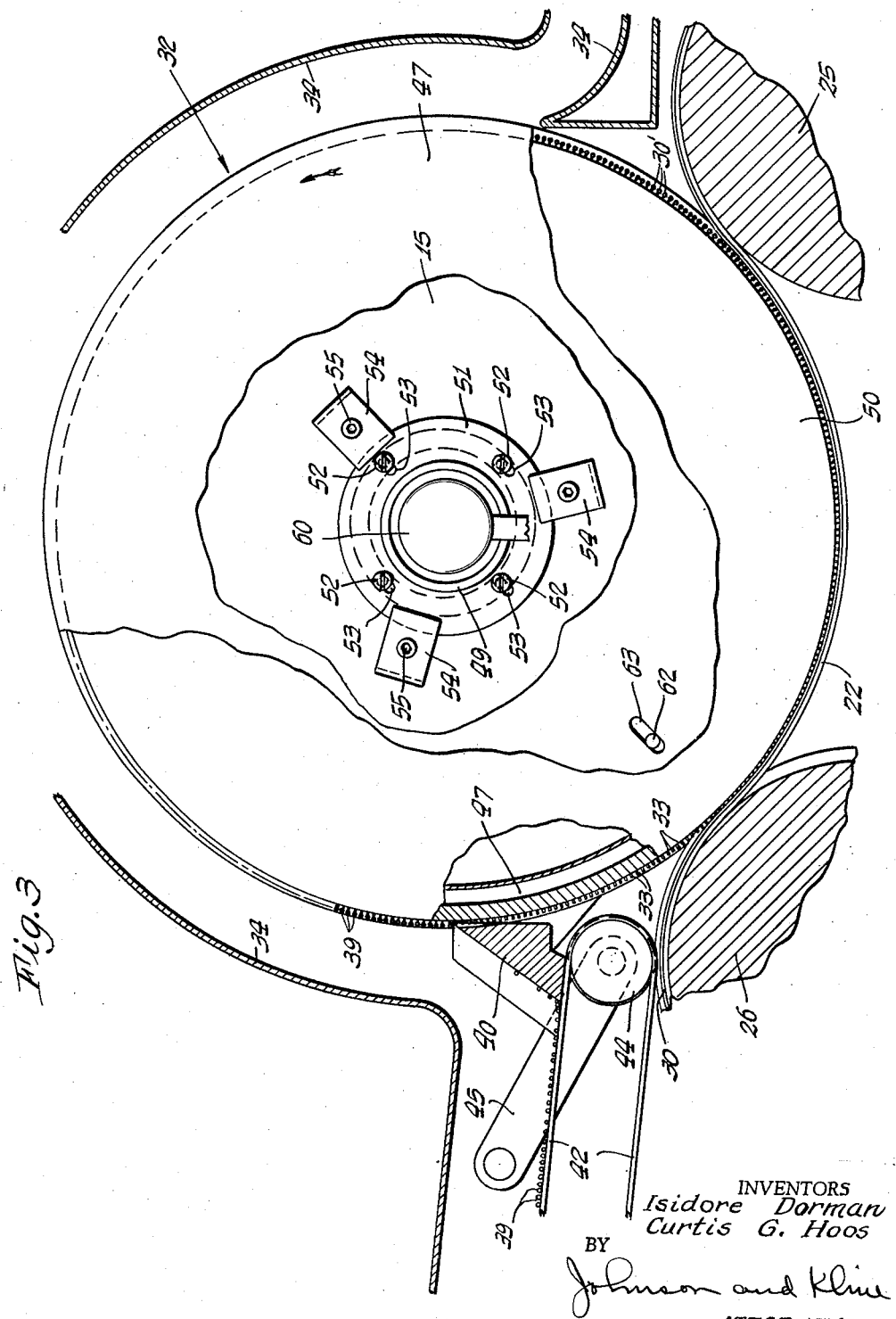
Fig. 3 is an enlarged fragmentary detailed view, partially broken away, illustrating the pellet forming drum of the apparatus and related parts.

Referring now to Figs. 3 and 4, the pin-carrying assembly 32 is described in detail. The assembly, which is frictionally driven by the metal belt 22 overlying pulley 26, is rotatably mounted in support 15, against radial displacement with respect thereto, through bearings 46. Guide disks 47, which are adapted to frictionally engage the belt adjacent the edges thereof as shown in Fig. 4, the hub 48 therefor are mounted by bearings 46 for rotation therewith. Inwardly of bearings 46, and mounted for rotation therewith, is a hub 49. The hub, which mounts a pin drum 50, is secured to bearings 46 for radial displacement with respect thereto, through bushings 51. Bolts 52 extend through slots 53 in the bushings and engage bearings 46 to retain the hub in any desired adjusted position relative the bearings, to provide rotational eccentricity between pin drum 50 and guide disks 47. Additional support for bushings 51 is provided by clamps 54, which are secured to support 15 through bolts 55. The eccentric rotational relationship between the pin drum and the guide disks enables the pins 33, on the drum, to be gradually withdrawn from the thin layer of molten material 30 on flexible metal belt 22 without agitation so that globules of a desired character are retained on the pins. It should here be noted that pin drum 50 is connected, through bar 62 affixed thereto, to guide disks 47, wherein the bar slidably engages slots 63, to be driven thereby.

The pin drum 50, which carries the pins 33, in a pattern similar to that illustrated in Fig. 6, is mounted on hub 49 between guide disks 47 and spaced therefrom by bearings 56. Adjacent the periphery of drum 50 is a cold fluid circulating chamber 57 having a partitioning wall 58 (see Fig. 1) extending thereacross. An inlet tube 59, connected through a coupling 60, of a type commonly known to the art, to a source of cold fluid circulation, and an outlet tube 61, similarly connected, are provided on opposite sides of partition 58 to open into chamber 57. In this manner, cold fluid is circulated through the chamber for chilling pins 33, thereby enabling the latter, on being inserted in the thin layer of molten material 30, to form globules thereof for subsequent rapid cooling into pellets.

In the operation of pellet forming machine 10, above described, the pin drum assembly 32 is eccentrically adjusted so that on rotation of the assembly, pins 33 will first be inserted and then gradually withdrawn from the thin layer of molten material formed on flexible metal belt 22. The molten polymorphic substance 17, which has been heated in tank 16, to a degree sufficient to bring high melting point crystals into being and thermally reduce the low melting point crystals therein, is removed from the tank by heated roller 19 which is chain driven from pulley 26. The pulley 26, which is driven by motor and speed reducer 27, drives flexible metal belt 22 into wiping engagement with the surface of heated roller 19 such that a thin layer of molten material 30 is formed on the surface of the belt. Continued travel of belt 22 positions the thin layer of molten material 30 to receive pins 33, mounted on pin assembly 32 which is frictionally driven by pulley 26. The pins 33, which are chilled to provide a cold surface, are inserted in the molten material, as schematically illustrated in Fig. 5, to a depth sufficient to form globules 30' of the material on the pins when the pins chill the material adjacent the aforesaid cold surface. It should here be noted that the assembly 32 carrying the pins 33 moves at the same rate as the belt 22 thereby substantially eliminating agitation of the molten material 30. Continued movement of belt 22 and rotation of assembly 32 causes the pins and their related globules, due to the eccentric nature of the assembly, to be gradually withdrawn from the thin layer of molten material and brought into the path of the cold air stream emanating from blower 36. This refrigerated air stream, in conjunction with the chilled pins, rapidly cools the globules 30', to a temperature below the forming point of the low melting point crystals and forms the globules into solid pellets 39, as schematically illustrated in Fig. 7. The pellets are then stripped from the pins by comb 40 and thereafter carried to an appropriate receptacle by conveyer belt 42. In this manner, pellets of polymorphic fat substance having the thermal and form-retaining characteristics of the high melting point crystals therein are produced for use in the manufacture of suppositories and like articles.

Thus, among others, the several objects of the invention as aforenoted are achieved. Obviously, numerous changes in the structure may be resorted to without departing from the spirit of the invention as defined by the claims.

We claim:

1. A method for forming pellets from thermoplastic material comprising the steps of providing a mass of thermoplastic material in a hot molten state, moving a thin layer of said material away from said mass, chilling a metal pin to provide a cold metal surface, moving the end of said pin into said thin layer to move therewith and without agitation of the material to chill said material around said pin and to form a globule of said material on the end of said pin, thereafter withdrawing said pin and globule from said thin layer, and rapidly cooling said globule to form a solid pellet.

2. A method for forming pellets from thermoplastic material comprising the steps of providing a mass of thermoplastic material in a hot molten state, chilling a metal pin to provide a cold metal surface, moving a thin layer of said molten material away from said mass, moving the end of said pin into said thin layer and therewith to prevent agitation of the material to chill said material around said pin and to form a globule of said material on the end of said pin, thereafter withdrawing said pin and globule from said thin layer and rapidly cooling said globule to form a solid pellet.

3. A method for forming pellets from a heated mass of polymorphic fat substance heated to a degree sufficient to produce a molten mass having only high melting point crystal nuclei therein and thermally reduce low melting point crystals comprising moving a thin layer of said substance away from said mass; chilling a metal pin to provide a cold metal surface thereon; inserting said cold metal surface of the pin into said thin layer and moving it therewith to prevent agitation of the material to form a globule of said molten material on said surface; withdrawing said pin and globule from the thin layer and rapidly cooling said globule to form a pellet on said surface having the thermal characteristics of said high melting point crystals.

4. A method for forming pellets from a heated mass of polymorphic fat substance heated to a degree sufficient to produce a molten mass having only high melting point crystal nuclei therein and thermally reduce low melting point crystals comprising agitating said molten mass; moving a thin layer of said substance away from said mass, chilling a pin to provide a cold metal surface thereon; inserting said cold metal surface of the pin into said thin layer and moving it therewith to prevent agitation of the material to form a globule of said molten material on said surface; withdrawing said pin and globule from said thin layer and rapidly cooling said globule to form a solid pellet on said surface.

5. A method for forming pellets from a heated mass of polymorphic fat substance consisting substantially of cocoa butter heated to 140° F., said heat being of a degree sufficient to produce a molten mass having only high melting point crystal nuclei therein and thermally reduce low melting point crystals comprising agitating said molten mass; moving a thin layer of said substance away from said mass; chilling a metal pin to provide a cold metal surface thereon; inserting said cold metal surface of the pin into said thin layer and moving it therewith to prevent agitation of the material to form a globule of said molten material on said surface; withdrawing said pin and globule from the thin layer and rapidly cooling said globule to form a solid pellet on said surface.

6. A method for forming pellets from a heated mass of polymorphic fat substance consisting substantially of cocoa butter heated to a degree sufficient to produce a molten mass having only high melting point crystal nuclei therein and thermally reduce low melting point crystals comprising moving a thin layer of said molten substance away from said mass; chilling a metal pin to provide a cold metal surface thereon; inserting said cold metal surface of the pin into said thin layer and moving it therewith to prevent agitation of the material to form a globule of said material thereon; withdrawing said pin and globule from said thin layer and rapidly cooling said globule to form a solid pellet on said cold metal surface having the thermal characteristics of said high melting point crystals.

7. A method for forming pellets from a heated mass of polymorphic fat substance consisting substantially of cocoa butter heated to a degree sufficient to produce a molten mass having only high melting point crystal nuclei therein and thermally reduce low melting point crystals comprising moving a thin layer of said molten substance away from said mass; chilling a metal pin to provide a cold metal surface thereon; inserting said cold metal surface of the pin into said thin layer and moving the pin therewith to form a globule of said material thereon; withdrawing said pin and globule gradually from the thin layer and rapidly cooling said globule to form a solid pellet on said cold metal surface having the thermal characteristics of said high melting point crystals.

8. A method for forming pellets from a heated mass of polymorphic fat substance heated to a degree sufficient to produce a molten mass having only high melting point crystal nuclei therein and thermally reduce low melting point crystals comprising agitating said molten mass; moving a thin layer of said molten substance away from said mass; chilling a plurality of metal pins to provide a plurality of cold metal surfaces thereon; inserting said cold metal surfaces of the pins into said thin layer and moving the pins therewith to prevent agitation of the material to form a globule of said material on each; withdrawing said pins and globules gradually from the thin layer and rapidly cooling said globules to form a solid pellet on each of said cold metal surfaces.

9. A method for forming pellets from a heated mass of polymorphic fat substance consisting substantially of cocoa butter heated to 140° F., said heat being of a degree sufficient to produce a molten mass having only high melting point crystal nuclei therein and thermally reduce low melting point crystals comprising agitating said molten mass; moving a thin layer of said molten substance away from said mass; chilling a cold metal pin to provide a cold metal surface thereon; inserting said cold metal surface of the pin into said thin layer and moving it therewith to prevent agitation of the material to form a globule of said material thereon; withdrawing said pin and said globule from the thin layer and rapidly cooling said globule to below the formation point of said low melting point crystals to form a solid pellet on said cold metal surface having the thermal characteristics of said high melting point crystals.

10. A method for forming pellets from a heated mass of polymorphic fat substance heated to a degree sufficient to produce a molten mass having only high melting point crystal nuclei therein and thermally reduce low melting point crystals comprising agitating said molten mass; moving a thin layer of said molten substance away from said mass; chilling a pin to provide a cold metal surface thereon; inserting said cold metal surface of the pin into said thin layer and moving said pin therewith to prevent agitation of the material to form a globule of said material thereon; withdrawing said pin and said globule from the thin layer; rapidly cooling said globule to form a solid pellet on said cold metal surface and removing said pellet from said pin.

11. An apparatus for forming pellets from thermoplastic material comprising a tank adapted to contain a mass of thermoplastic material in a hot molten state, means for moving a thin layer of said material away from said mass, a metal pin, means for chilling said pin to provide a cold metal surface, means for moving the end of said pin into said thin layer of molten material and therewith to prevent agitation to chill said material around the pin and to form a globule of said material on the end of the pin, means for withdrawing said pin and the globule from said thin layer of molten material and means for rapidly cooling said globule to form a solid pellet.

12. An apparatus for forming pellets from a heated mass of polymorphic fat substance consisting substantially of cocoa butter heated to a degree sufficient to produce a molten mass having only high melting point crystal nuclei therein and to thermally reduce the low melting point crystals therein comprising a tank adapted to contain a mass of molten cocoa butter, means for moving a thin layer of said molten butter away from said mass, a metal pin, means for chilling said pin providing a cold metal surface thereon, means for inserting the cold metal surface of said pin into the thin layer and moving it therewith so that agitation of the material is prevented to form a globule of molten material thereon, means for withdrawing the pin and globule from said thin layer and means for rapidly cooling said globule to form a solid pellet on said surface.

13. An apparatus for forming pellets from a heated mass of polymorphic fat substance consisting substantially of cocoa butter heated to a degree sufficient to produce a molten mass having only high melting point crystal nuclei therein and to thermally reduce the low melting point crystals therein comprising a tank adapted to contain a mass of molten polymorphic fat substance, means for moving a thin layer of said molten substance away from said mass, a metal pin, means for chilling said pin providing a cold metal surface thereon, means for inserting the cold metal surface of said pin into the thin layer and moving it therewith to prevent agitation of the material to form a globule of molten material thereon, means for withdrawing the pin and globule from said thin layer and means for rapidly cooling said globule to form a solid pellet on said surface.

14. An apparatus for forming pellets from a heated mass of polymorphic fat substance heated to a degree sufficient to produce a molten mass having only high melting point crystal nuclei therein and to thermally reduce the low melting point crystals therein comprising a tank adapted to contain a mass of molten polymorphic fat substance, a continuous belt mounted for movement and positioned adjacent said tank to cooperate therewith for removing a thin layer of molten material therefrom, a metal pin, means for chilling said pin providing a cold metal surface thereon, means for moving said pin with said belt and inserting the cold metal surface of said pin into the thin layer so that agitation of the material is prevented to form a globule of molten material thereon, means for gradually withdrawing the pin and globule from said thin layer and means for rapidly cooling said globule to form a solid pellet on said surface.

15. An apparatus for forming pellets from a heated mass of polymorphic fat substance heated to a degree sufficient to produce a molten mass having only high melting point crystal nuclei therein and to thermally reduce the low melting point crystals therein comprising a tank adapted to contain a mass of molten polymorphic fat substance, a continuous belt mounted for movement and positioned adjacent said tank to cooperate therewith for removing a thin layer of molten material therefrom, a drum rotatably mounted and positioned adjacent said belt and having a metal pin projecting from said rotatable drum adapted to be moved into the thin layer of molten material, means for chilling said pin to provide a cold metal surface thereon, means connected to said drum for rotating said drum so that the cold metal surface of said pin is inserted into the thin layer on said belt and moved therewith to prevent agitation of said material to form a globule of molten material thereon, means for gradually withdrawing the pin and globule from said thin layer, means for rapidly cooling said globule to form a solid pellet on said surface and means for removing said pellet from said pin.

16. An apparatus for forming pellets from a heated mass of polymorphic fat substance heated to a degree sufficient to produce a molten mass having only high melting point crystal nuclei therein and to thermally reduce the low melting point crystals therein comprising a tank adapted to contain a mass of molten polymorphic fat substance, a continuous belt mounted for movement and positioned adjacent said tank to cooperate therewith for moving a thin layer of material therefrom, a drum rotatably mounted and positioned adjacent said belt, a plurality of metal pins mounted on said rotatable drum adapted to be moved into the thin layer of molten material, means for chilling said pins to provide cold metal surfaces, means connected to said drum for rotating said drum so that the cold metal surfaces of said pins are inserted into the thin layer on said belt and moved therewith to prevent agitation of the material to form globules of molten material on said pins, means for gradually withdrawing the pins and related globules from said molten mass and means for rapidly cooling said globules to form solid pellets on each of said surfaces.

17. An apparatus for forming pellets from a heated polymorphic fat substance as in claim 16, wherein said pin-carrying drum is eccentrically rotatably mounted for gradually withdrawing said pins and globules from said thin layer of molten material.

18. An apparatus for forming pellets from a heated mass of cocoa butter heated to a degree sufficient to produce a molten mass having only high melting point crystal nuclei therein and to thermally reduce the low melting point crystals therein comprising a frame, a tank mounted on said frame and adapted to contain a mass of molten cocoa butter, a continuous belt mounted on said frame and positioned adjacent said tank to cooperate therewith for moving a thin layer of molten cocoa butter therefrom, a drum eccentrically rotatably mounted on said frame and positioned adjacent said belt and having a plurality of metal pins mounted on said rotatably mounted drum adapted to be moved into the thin layer of molten material, means for chilling said pins to provide cold metal surfaces, means connected to said drum for rotating said drum so that the cold metal surfaces of said pins are inserted into the thin layer on said belt and moved therewith to prevent agitation of the material to form globuels of molten material on said pins, said eccentric rotation of said drum witdhrawing the pins and globules from said thin layer, means for rapidly cooling said globules to below the formation point of said low melting point crystals to form solid pellets on said surfaces, and means for removing said pellets from said pins.

References Cited in the file of this patent

UNITED STATES PATENTS

| 803,846 | Pereira | Nov. 7, 1905 |
| 1,527,659 | Wilkie | Feb. 24, 1925 |
| 1,644,115 | Eggimann et al. | Oct. 4, 1927 |
| 2,136,185 | Ferngren | Nov. 8, 1938 |
| 2,718,667 | Malm et al. | Sept. 27, 1955 |

FOREIGN PATENTS

| 784,285 | France | Apr. 29, 1935 |